Patent

United States Patent [19]

Bannan

[11] 4,103,853

[45] Aug. 1, 1978

[54] ALUMINUM CLUSTER MOUNT

[75] Inventor: Edward C. Bannan, Vicksburg, Miss.

[73] Assignee: McGraw-Edison Company, Elgin, Ill.

[21] Appl. No.: 753,605

[22] Filed: Dec. 22, 1976

[51] Int. Cl.² .............................................. E04G 3/00
[52] U.S. Cl. ................................. 248/219.1; 211/107;
                                              248/225.3; 248/230
[58] Field of Search ..................... 211/107; 248/219.1,
                              248/219.3, 219.4, 225.3, 226.3, 230

[56] References Cited

U.S. PATENT DOCUMENTS

| 2,883,135 | 4/1959 | Smalley | 248/230 |
| 3,374,978 | 3/1968 | Salmon et al. | 211/107 |
| 3,497,171 | 2/1970 | Farmer et al. | 211/107 |
| 3,734,438 | 5/1973 | Kautz | 211/107 |

Primary Examiner—James C. Mitchell

Attorney, Agent, or Firm—Jon Carl Gealow; Thomas E. McDonald; Ronald J. LaPorte

[57] ABSTRACT

A positive-locking cluster mount for supporting electrical transformers and like heavy objects from upright poles characterized by bearing plates held in circumferentially spaced relationship about the pole by adjustable link members and end links each having singular hook ends that engage into the slotted side walls of the bearing plates and are locked into initial loose, though positively connected, positions by the placement of the diverging support brackets thereon. This facilitates the placement of the partially assembled cluster mount at a desired position on the pole and also facilitates the final connection and tightening of the cluster mount thereabout to receive the transformers. The support brackets are assembled in outwardly diverging paired relationship from bearing plates of different lengths to accommodate small and large transformers.

11 Claims, 10 Drawing Figures

ALUMINUM CLUSTER MOUNT

BACKGROUND OF THE INVENTION

Various types of clamps and brackets are known in the art for the purpose of attaching cross-arms, transformers and other equipment to wooden poles. Blackstone U.S. Pat. No. 2,708,087 discloses six centerpoise transformer racks that are placed in sets of three about a pole and held one to the other by curved T-bolts, the T-heads thereof engaging shaped slots in the racks.

Hamilton U.S. Pat. No. 1,898,725 shows a cross-arm clamp comprising two generally L-shaped brackets having inclined extensions at one end through which an attaching bolt is inserted. The other ends of the brackets adjustably attach to each other by means of an upstanding ear or head on one of the brackets that engages a hole in the other. A wedge lock is also used.

A guy wire attachment is shown in Petersen U.S. Pat. No. 2,703,216 which includes a pair of cleats tied around the pole by a plurality of cables and an adjustable clamp. Ward U.S. Pat. No. 2,761,643 uses as a cluster mount a series of straps or curved plates tied with bolts around the pole with a pair of racks which project radially outward and provide at their ends a further adjustable plate for attachment to transformers of different sizes and weights.

Anderson U.S. Pat. No. 2,879,964 provides a shaped plate having a U-shaped cross section with a central elongated indentation to encompass a part of the circumference of the pole to be held by lag bolts screwed into the pole. A pair of narrower deeper U-shaped plates bolt over the shaped plate to provide a mounting for a third transformer.

Salmon et al. U.S. Pat. No. 3,374,978 provides three elongated bearing plates of generally U-shaped cross section which fit in circumferentially spaced positions against the sides of the pole. The radially directed side flanges of the bearing plates each have a pair of elongated vertical slots. The outer portions of the flanges on each plate are shaped to receive and be encompassed by a pair of diverging bolt-on U-shaped brackets. Two pairs of connecting links and a pair of attaching brackets are provided to engage the opposing spaced slots of adjacent pairs of bearing plates and thereby encompass the pole's circumference. Each end of the connecting links and the remaining ends of the attaching brackets have a series of inwardly directed parallel spaced hooks or projections that engage the inner edges of the respective slots in the flanges of the bearing plates to provide an adjustable girth for different diameter poles. Lock bolts are provided to hold and urge the connecting links toward the pole during the initial assembly steps and lock them against outward movement. The attaching brackets of Salmon et al are reversible on each bearing plate to accommodate smaller transformers.

SUMMARY OF THE INVENTION

In accordance with this invention a cluster mount is provided in which the support arms automatically lock the ends of the connecting links or bands, as well as the enclosing end links, to the base plates whereby to form an assembly which is readily handled and placed into a selected position upon a pole without coming apart and without the necessity of auxillary clips or other fasteners to hold the connecting links or end links in place prior to or after the attachment of the enclosing end links about the pole. Briefly the base plates are provided with opposing side slots that receive the hook ends of a pair of adjustable links or bands and the hook ends of the enclosing end links in one position and are locked into said slots in a second position by the sliding engagement of the support brackets which close the effective opening of the slots when they are telescoped into position and bolted into place. The number of parts involved in the assembly is reduced and the manner of assembly and adjustment of the parts is simplified over that of the prior art. Also, the parts assemble in but one manner which is readily discerned by inspection.

DESCRIPTION OF THE DRAWINGS

Other objects, uses and advantages of this invention will become apparent from the description in which an illustrative embodiment is shown in the drawings wherein.

DESCRIPTION OF THE PREFERRED EMBODIMENTS

Figure 1:
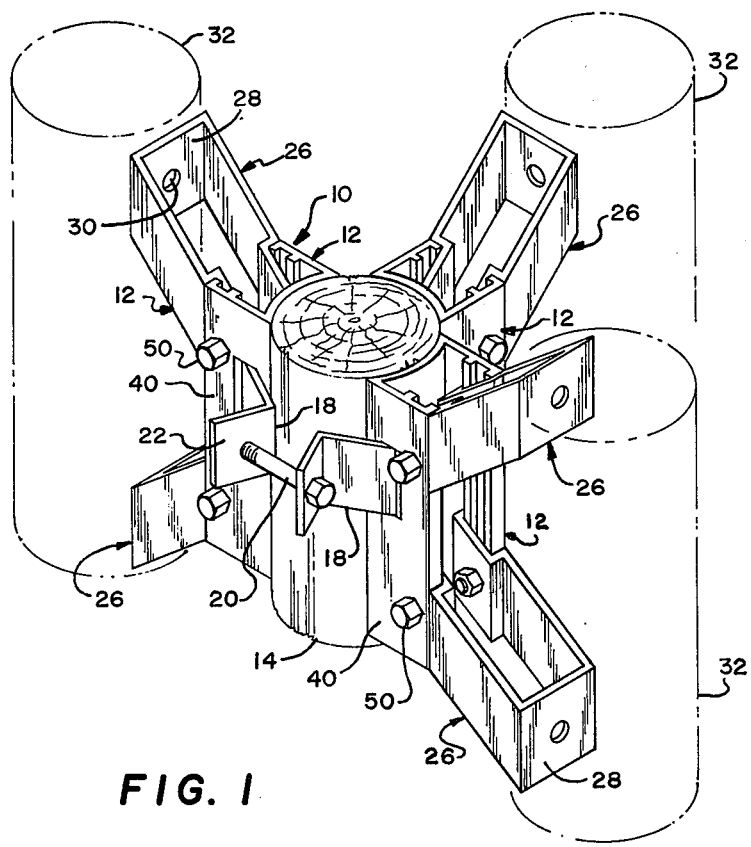
FIG. 1 is a perspective view of an embodiment of the cluster mount of this invention attached to a vertical pole, parts of which are cut away, and illustrating by means of dotted lines three transformers carried by the assembly.

In the description which follows the features of the invention are illustrated in relation to an improved device for supporting electrical devices on vertical poles for power lines. However, these features can be utilized singly or in combination to provide improvements in other supporting devices and the invention is not to be limited to the embodiments shown in the drawings. A wide variety of uses suggest themselves once the features of the invention are illustrated.

Figure 2:
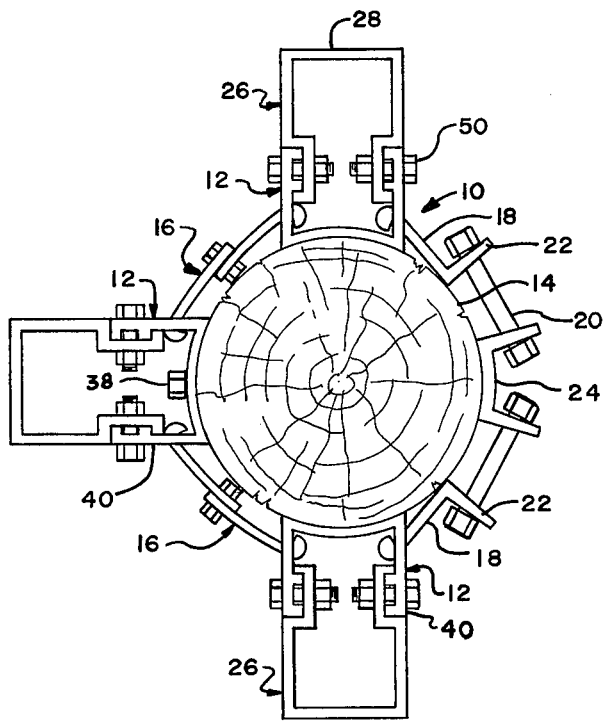
FIG. 2 is a top view of the assembly of FIG. 1 showing the use of a filler link for larger diameter poles.

Referring to FIGS. 1 and 2 the cluster mount 10 of this invention includes the plurality of three bearing plate means 12 which are held in spaced relationship about the circumference of the pole 14 by means of the pair of connecting links 16, the end links 18 and the bolts 20. The pole 14 in FIG. 1 is of smaller diameter than the pole 14 illustrated in FIG. 2. Thus, one bolt 20 completes the linkage around the pole in FIG. 1 by means of suitable bore holes in the off-set flanges 22 of the end links 18, while in FIG. 2 a pair of such bolts 20 is used with the filler link 24 connected therebetween to accommodate the larger diameter pole.

As related to the support of one or more heavy objects on a pole, the arrangement of FIG. 1 can be used for poles of diameters up to about 11 inches and the arrangement of FIG. 2 can be used for poles of diameters of 11 to 15 inches or more dependent only on the length of bolts used and the dimensions of the parts.

Each bearing plate 12 carries a pair of support or bracket arms 26 which extend radially outward therefrom with the upper support arms directed at an angle extending upwardly from the center of the pole and the lower support arms directed at an angle downwardly from the center of the pole. The pairs of diverging support arms 26 carried by each bearing plate 12 are vertically oriented, in the embodiment shown, so that their end plates 28 are in a generally vertical plane for attachment, by means of the bore holes 30, to the electrical apparatus 32 representing transformers.

Figure 3:
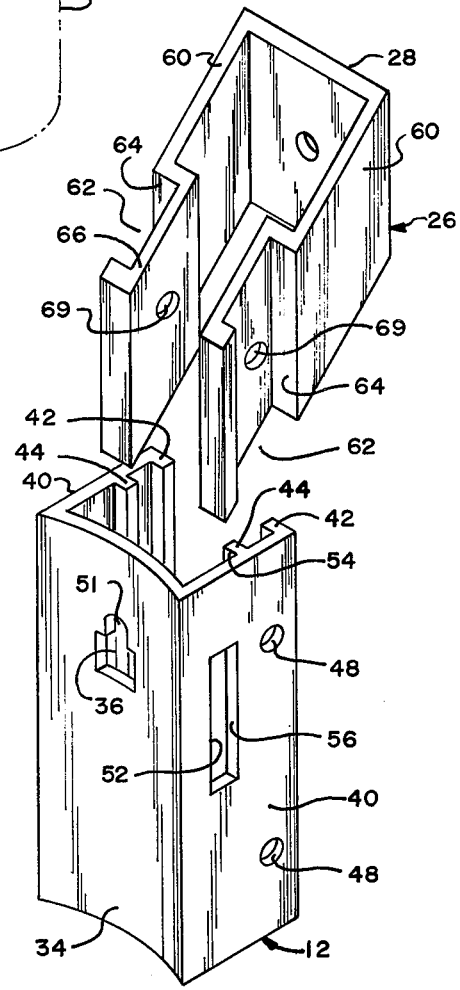
FIG. 3 is a perspective exploded view of a base plate and a support arm to illustrate the manner in which these parts inter-engage in sliding telescopic relationship.
Figure 6:
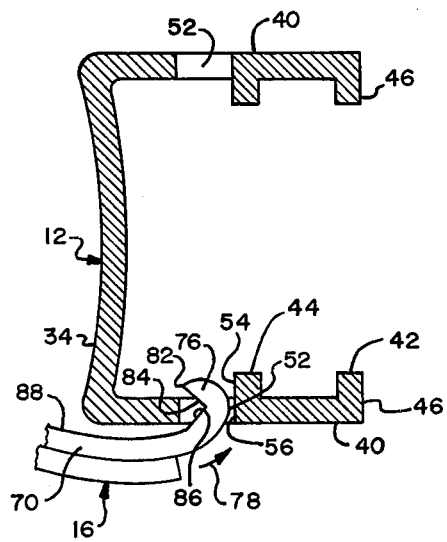
FIG. 6 is a fragmentary cross-sectional view of a base plate to show the relationship of the side slots to the internal flanges, the first position of a connecting link as its hook end is inserted into a slot and the relation of the hook end of an end link with its associated slot.

As more clearly shown in FIGS. 3 and 6, each of the bearing plates 12 is generally U-shaped in cross-section and has the transverse wall 34 which may be concave so as to conform with the outer surface of a pole. The transverse wall 34 includes a hole 36 to receive a lag screw or heavy nail 38 (see FIG. 2) that has been affixed to the pole at a desired installation height, for the known purpose of temporarily supporting the assembly or at least one of the bearing plates while the remaining parts are assembled and clamped into position.

The bearing plates 12 are preferably formed by the extrusion of an aluminum alloy of suitable strength and lightness of weight for the intended purpose, since this is an inexpensive way of forming a structure of this cross-section which includes an inner projection on each of the walls 40, here illustrated by the pair of inner longitudinally spaced flanges 42 and 44. The flanges 42 and 44 may be of substantially equal width, are generally parallel, and extend the entire length of the plate 12 on the inside of each of the walls. The outer faces or edges 46 are flat and likewise coplanar. Each wall 40 has a pair of bore holes 48, preferably located between the projecting flanges 42 and 44 for the purposes of receiving the fastening means or bolts 50 (see FIGS. 1 and 2) which hold the angular brackets 28 in place. Instead of a pair of flanges 42 and 44, this inward projection can be defined by a single flange of sufficient cross-sectional body to serve the intended purposes. The bore holes 48 are equally spaced from the ends of the bearing plates.

The hole 36 is positioned closer to one end of the bearing plates 12 and has the notch 51 in its top wall to receive the shank of the lag screw 38 and allow the head to be brought to bear against the wall 34 as the bearing plate is attached to the pole. The walls 40 have matching opposing elongated slots 52 of rectangular configuration which are located nearer the same end of the bearing plates. Two or more bearing plates thus oriented around a pole will have their slots 52 oriented in a circumferential path slightly above the centers of the plates for receipt of the connecting links 16 and end links 18 in a manner to be described.

Still referring to FIGS. 3 and 6, the inner surface or edge 54 of the flange 44 and the outer edge 56 of the slot 52 are shown to be coplanar, that is the slot 52 is cut out right up to the flange 44. This relationship is not critical as long as the flange 44 is at least adjacent to the slot as will be further described.

The support arms or brackets 26, as shown in FIGS. 1, 2 and 3 are likewise U-shaped in cross-section and are preferably also formed by extrusion. These members are cut from the extrusion at an angle, preferably of about 45° to their longitudinal axes so that when a pair is assembled in reverse positions upon a bearing plate they extend or diverge upwardly and downwardly with their transverse walls 28 spaced properly in a vertical plane to receive the fastening means associated with the transformers 32. This relationship is controlled by the length of the bearing plates 12 and the vertical distance between the pairs of holes 48. This invention contemplates cluster mounts of two dimensions, one having a 12 inch spacing between the bolt holes 30 to accommodate transformer to 50 KVA and a second, with a 24 inch spacing between these bore holes to accommodate transformers to 167 KVA, with the brackets mounted in diverging positions for each such dimension.

The spaced side walls 60 of each bracket member 26 are generally parallel and the total width is about that of the bearing plates 12, except for the inward off-sets or recesses 62 defined by the ends or off-sets 64 of the walls 60, the connecting walls 66 and the edge flanges 68. The rectangular opening or recesses 62 on the walls 60 extend parallel to the end wall 28 and have about the same depth as the flanges 42 and 44 so that the walls 66 fit within the inner edges of the flanges 42 and 44 in sliding telescoping relationship. The flanges 68 overlap the flanges 44 and the ends 64 of the walls 60 are adjacent the face 46 of the flange 42 when the brackets and bearing plates are brought together. The walls 66 can include a longitudinal inner flange (not illustrated) which fills the space between the flanges 42 and 44.

The opposing bore holes 69 in the walls 66 can thus be brought into alignment with the bore holes 48 for insertion of the attaching bolts 50 on each side. The connecting links 16 and the end links 18 engage between adjacent pairs of bearing plates 12 by engagement of their hook ends in the slots 52.

Figure 4:
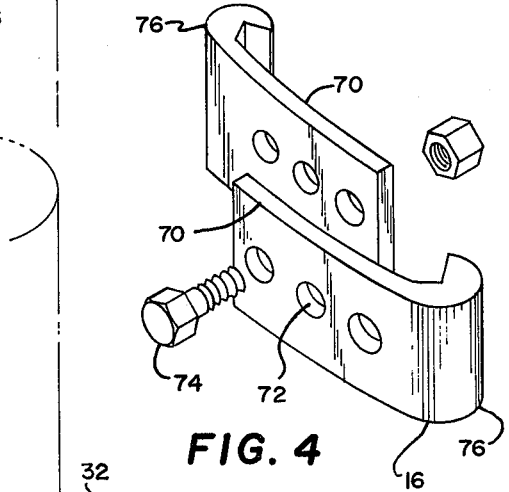
FIG. 4 is a perspective view of one of the connecting links and the adjusting bolt fastener therefor.

As shown in FIG. 4 the connecting links 16 comprise a pair of identical curved extruded bands 70, having two or more bore holes 72, which are adjustably connected face to face by the bolts 74 so that their hook ends 76 are at opposite ends of the assembly and turned to the same side. It is apparent that the effective length or circumferential span of each connecting link 16 can be readily adjusted by registry of the selected holes 72 prior to insertion of the bolt 74. The holes 72 are equally spaced along the length of the bands 70 for convenience in assembly and adjustment in three positions.

The manner in which the inwardly directed hook ends 76 engage the slots 52 is illustrated in FIGS. 6 through 10 wherein, in FIG. 6 the initial engagement of a hook end 76 with a slot 52 is shown prior to the assembly of the brackets 26 thereon. In FIG. 6 the connecting link 16 is being rotated in the direction of the arrow 78 in relation to a bearing plate 12, there being ample space on each side of the hook as it is so oriented and moved.

In one embodiment each hook 76 has a generally circular outer surface 80, the curvature of which is progressively shorter to the tip or edge 82. The inside of the hook 76 is defined by two planar surfaces 84 and 86 which intersect at about 90° with the latter surface 86 forming an obtuse angle with the inner surface 88 of the band 70.

The second band 70 has its end edge 90 spaced longitudinally from the curved end surface 80 and defines an off-set or abutment increasing the effective thickness of the assembled connecting link 16. Further turning of the connecting link 16 to and beyond the position shown in FIG. 7 temporarily attaches the hook end 76 in the slot 52. This is because the diametric dimension A is larger than the width of the slot 52. However, the effective transverse width or thickness of the hook end 76 from the tip 82 progressively around to the curved surface 88 is less than the width of the slot 52.

Figure 8:
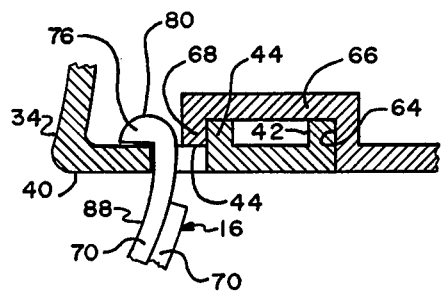
FIG. 8 is a fragmentary cross-sectional view like FIG. 7 with a bracket arm in place as a step in the assembly.
Figure 5:
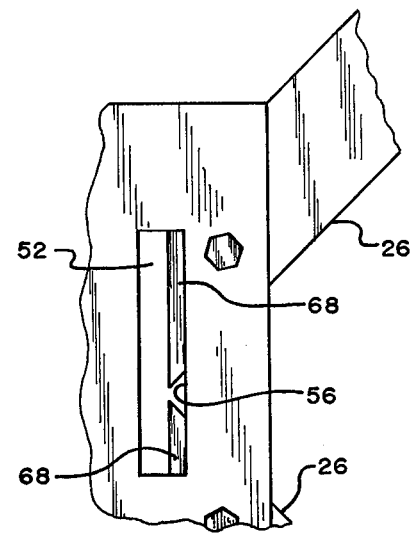
FIG. 5 is a fragmentary side view of a base plate to illustrate the manner in which the upper and lower support arms partially close the side slots in the base plate.

Upon placement of a bracket 26 in telescoping relationship with the bearing plate 12, the edge flanges 68 overlap the flanges 44, as shown in FIGS. 5 and 8, and the slot 52 is partially closed by the overlapping flange 68. The introduction of the second bracket 26 on the lower end of the bearing plate 12 causes its flange 68 to partially close the slot 52, as also shown in FIG. 5.

Figure 9:
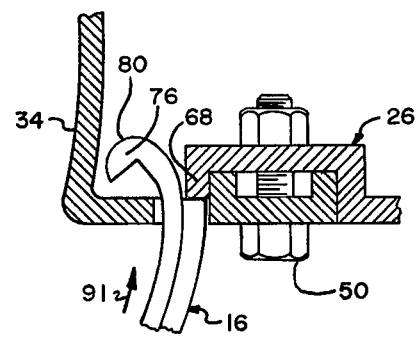
FIGS. 9 and 10 are fragmentary cross-sectional views like FIG. 8 only with the bracket arm bolted into place to show the manner in which the hook end of a link is effectively locked within the slot.
Figure 7:
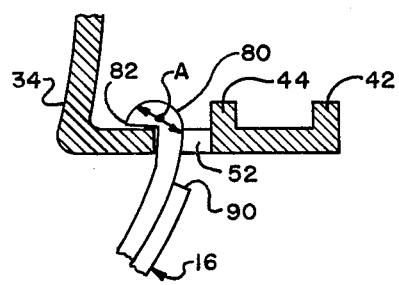
FIG. 7 is a fragmentary cross-sectional view, similar to FIG. 6, to show the relationship of the hook end of a link with the slot after engagement therein.
Figure 10:
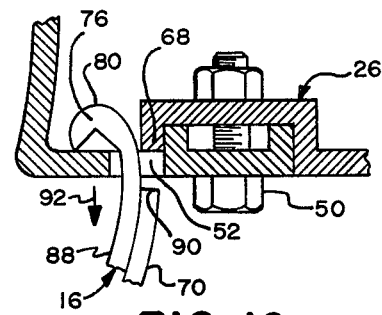

The assembly of the bracket 26 with the bearing plate 12 is completed by alignment of the holes 48 and 69, and placement of the bolts 50 on each side. The lower bracket 26 is similarly attached but not illustrated in these FIGS. The hook end 76 is thereby effectively locked within the slot 52 against inward thrust as shown by the arrow 90 in FIG. 9 wherein the edge 90 may abutt against the flange 68. FIG. 10 shows that this locking action prevents the removal of the connecting link 16 in the direction of the arrow 92 wherein the remaining space in the slot 52 is insufficient for the outward passage of the hook end 76 at all angles.

The device of this invention can be readily attached to a pole in several ways. Having selected the desired height on the pole, its diameter is approximated and optionally the lag screw 38 can be attached at the selected position. A base plate 12 can be hung on the lag screw and tightened down to start the assembly. A connecting link, adjusted to span about a quarter of the circumference is then inserted in the side slots 52 of this base plate and either the upper or lower bracket 26 is telescoped into position and bolted in place followed by the remaining bracket. Although the connecting links are now locked into place they can still be pivoted and moved in the slots 52 as shown in FIGS. 8, 9 and 10, which facilitates the hooking of the next base plates 12 on the remaining ends of these links. Next, the end links 18 are inserted with their hook ends in the remaining slots of these latter base plates and the insertion of the second pairs of brackets 26 again locks the multiple parts together. The two end links 18 are moved up diametrically opposite the first bracket on the other side of the pole and the final bolt 20 with or without the filler link 24 is attached.

The mounting bolts 50 can all be tightened down and, if necessary, any final adjustment of one or more of the connecting links 16 made to obtain the desired spacing of the attaching walls 28 around the pole. The final tightening of the bolts 20 brings the hook ends 76 into the relationship shown in FIG. 8 with respect to the inner edges of each slot 52 with the corner surfaces 84 and 86 abutting the inside of the wall 40 and the inside edge of the slot 52 as illustrated. However, it is not necessary that this corner of the hook end be so oriented since it is locked against removal and the hook can engage the notch 52 at any angle without coming out. The cluster mount 10 is now ready to receive the bearing transformers 32.

Alternately, the entire device can be assembled, carried up the pole, wrapped around the pole and fastened in the desired supporting position.

Accordingly a mount for supporting electrical apparatus on an associated pole is provided by this invention in which the connecting links are locked into the side slots of the bearing plates by means of the overlapping portions of the bracket means. As long as the brackets are in position, whether all of the bolts are tightened down or not, the cluster mount remains connected and can be readily attached to the pole.

What is claimed is:

1. A mount for supporting electrical apparatus on an associated pole comprising:
   bearing plate means of generally U-shape with a transverse wall adapted to bear against said pole and having outwardly extending substantially parallel wall portions;
   slot means in said wall portions of said bearing plate means;
   connecting link means having a hook member on the end thereof for engagement into said slot means and attaching said bearing plate means around said pole; and
   bracket means fastenable to said bearing plate means and having mounting means for fastening said electrical apparatus thereto;
   said bracket means having a portion overlapping said slot means to lock said hook member therein upon being fastened to said bearing plate means.

2. A mount for supporting electrical apparatus in accordance with claim 1 in which:
   the outwardly extending wall portions of said bearing plate means each define a transverse projection having an edge adjacent an edge of said slot means;
   the bracket means comprises a generally U-shaped member having a pair of inwardly extending substantially parallel walls each defining a recess along their outer surfaces;
   said transverse projections on the wall portions of said bearing plate means and the recesses on the outer surfaces of said walls of said bracket means being adapted to receive one another in sliding relationship with said edges of said projections overlapping said slot means whereby to lock said hook members into place; and
   fastening means are provided to secure said bracket walls to said bearing plate walls in said locked position.

3. A mount for supporting electrical apparatus in accordance with claim 1 in which:
   said bearing plate means comprises a plurality of bearing plate means each having slot means therein adjacent opposite side walls thereof;
   said bracket means comprises a pair of bracket means associated with each of said bearing plate means; and
   said connecting link means comprises a plurality of said connecting link means each having a single hook member on opposite ends thereof.

4. A mount for supporting electrical apparatus on an associated pole comprising:
   an elongated bearing plate of generally U-shape with a transverse wall adapted to bear against said pole and having outwardly extending substantially parallel wall portions;
   said wall portions each defining an inward projection along its inside surface and having slot means extending adjacent and substantially parallel to said projections;

means for attaching said bearing plate around said pole including connecting link means having a single hook member on an end thereof adapted to engage within said slot means;

a pair of generally U-shaped bracket means each having a transverse wall for mounting said electrical apparatus and inwardly extending substantially parallel wall portions each defining an open-ended recess along its outer surface;

said inward projections on the wall portions of said bearing plate means and the recesses along the outer surfaces of the wall portions of said bracket means being adapted to engage each other in sliding telescoping relationship with a part of each of said wall portions of said bracket means closing a portion of said slot means to lock said hook member therein, the transverse walls of said U-shaped bracket means being off-set away from the center of said elongated bearing plate to define a single spacing of said transverse walls for the support of said electrical apparatus; and attaching means to affix said pair of bracket means to said bearing plate in said single spaced relationship.

5. A mount for supporting electrical apparatus on an associated pole comprising:

an elongated bearing plate of generally U-shape with a transverse wall adapted to bear against said pole and having outwardly extending substantially parallel wall portions defining an inwardly projecting flange along their outer edges;

slot means in said wall portions of said bearing plate adjacent to each of said inwardly projecting flanges, said slot means having substantially parallel inner and outer edges;

link means having a hook member at an end adapted to engage within said slot means with the hook member engageable around said inner edge of said slot means;

a pair of generally U-shaped bracket members each having a transverse wall for mounting said electrical apparatus;

each of said U-shaped bracket members having inwardly directed wall portions defining a recess along their inner edges adapted to slideably engage upon the projecting flanges of said wall portions of said bearing plate with their transverse walls off-set away from the center of said bearing plate; and the wall portions of one of said U-shaped bracket members having a protuberance that extends over the outer edge of said slot means to lock said hook members therein.

6. A mount for supporting electrical apparatus in accordance with claim 5 in which:

said link member comprises a flat band and the hook member at the end thereof is defined by an outer curved surface extending transverse the longitudinal axis of said band and inner corner surfaces;

the largest diameter of said curved outer surface being greater than the edge-to-edge width of said slot and the effective width of said hook member between said inner corner and said outer curved surface is less than the width of said slot to allow its insertion therein and in the locked position said protuberance closes the width of said slot to a dimension less than the effective width of said hook member.

7. A mount for supporting electrical apparatus in accordance with claim 6 in which said link member comprises:

a pair of substantially identical flat bands in face-to-face contiguous relationship with their end hook members on the same side; and means are provided to adjustably attach said bands to each other with their end hook members selectively spaced from each other.

8. A mount for supporting electrical apparatus in accordance with claim 5 in which:

the wall portions of the other of said U-shaped bracket members is provided with a protuberance that extends over the outer edge of said slot means to lock said hook members therein.

9. A mount in accordance with claim 5 including:

means to attach said bracket members to said bearing plate in fixed diverging positions;

and the transverse walls thereof for mounting said electrical apparatus extend therefrom in a single vertically oriented spacing adapted to accommodate electrical apparatus having mounting means of the same spacing.

10. A mount in accordance with claim 5 in which:

the outer edge of said slot means is substantially coplanar with the inner surface of said projecting flange; and the protuberance on the wall portions of said U-shaped bracket member comprises an outwardly projecting flange that overlaps said flange of said wall portions of said bearing plate.

11. A mount for supporting electrical apparatus in accordance with claim 9 in which:

one fixed diverging position of said transverse walls of said U-shaped brackets accommodates an electrical apparatus having fastening means spaced approximately 12 inches on center and a second fixed diverging position accommodates fastening means spaced approximately 24 inches on center.

* * * * *